Sept. 6, 1949. S. W. HAYES 2,481,421
METALWORKING APPARATUS
Filed Dec. 28, 1943 5 Sheets-Sheet 2
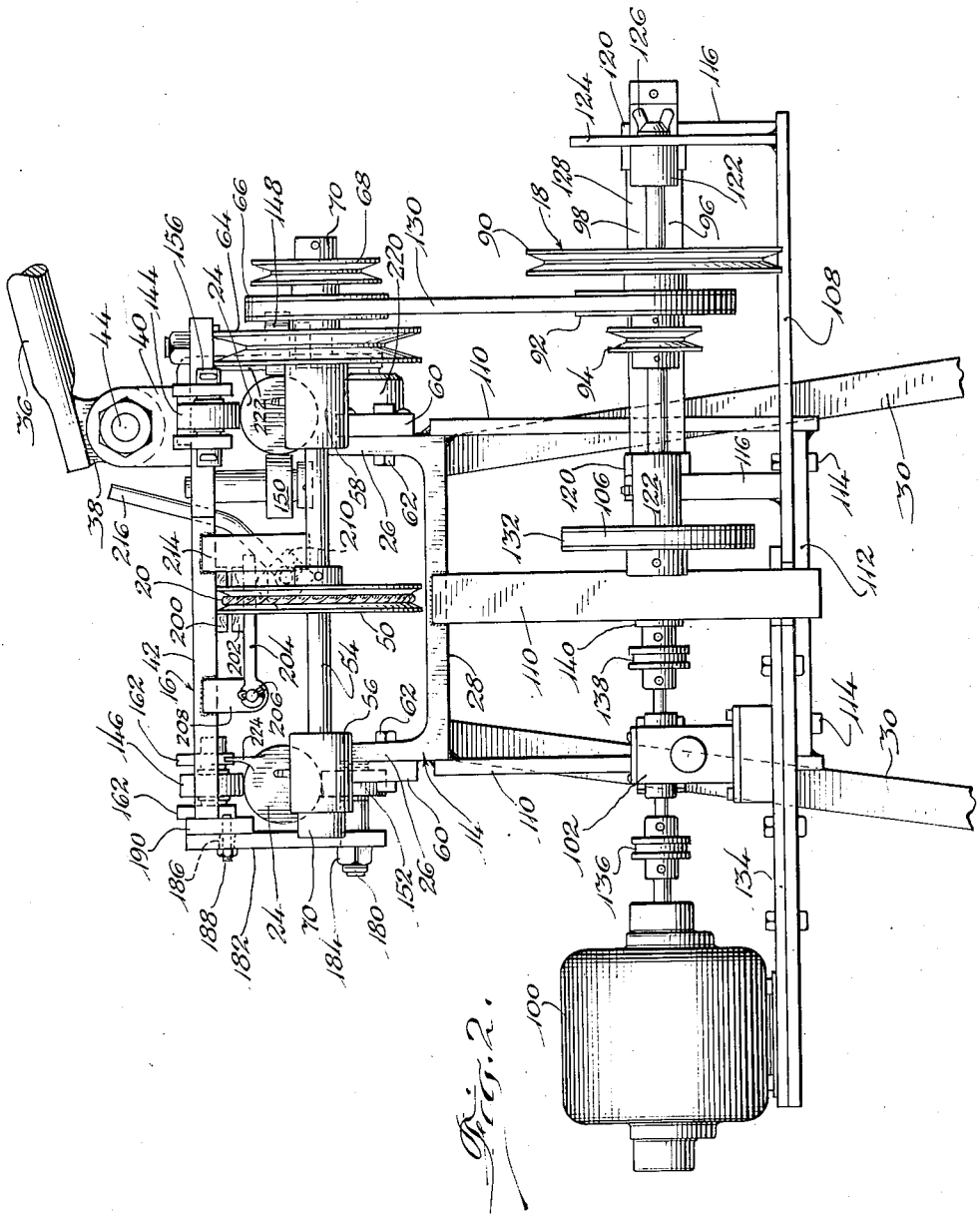

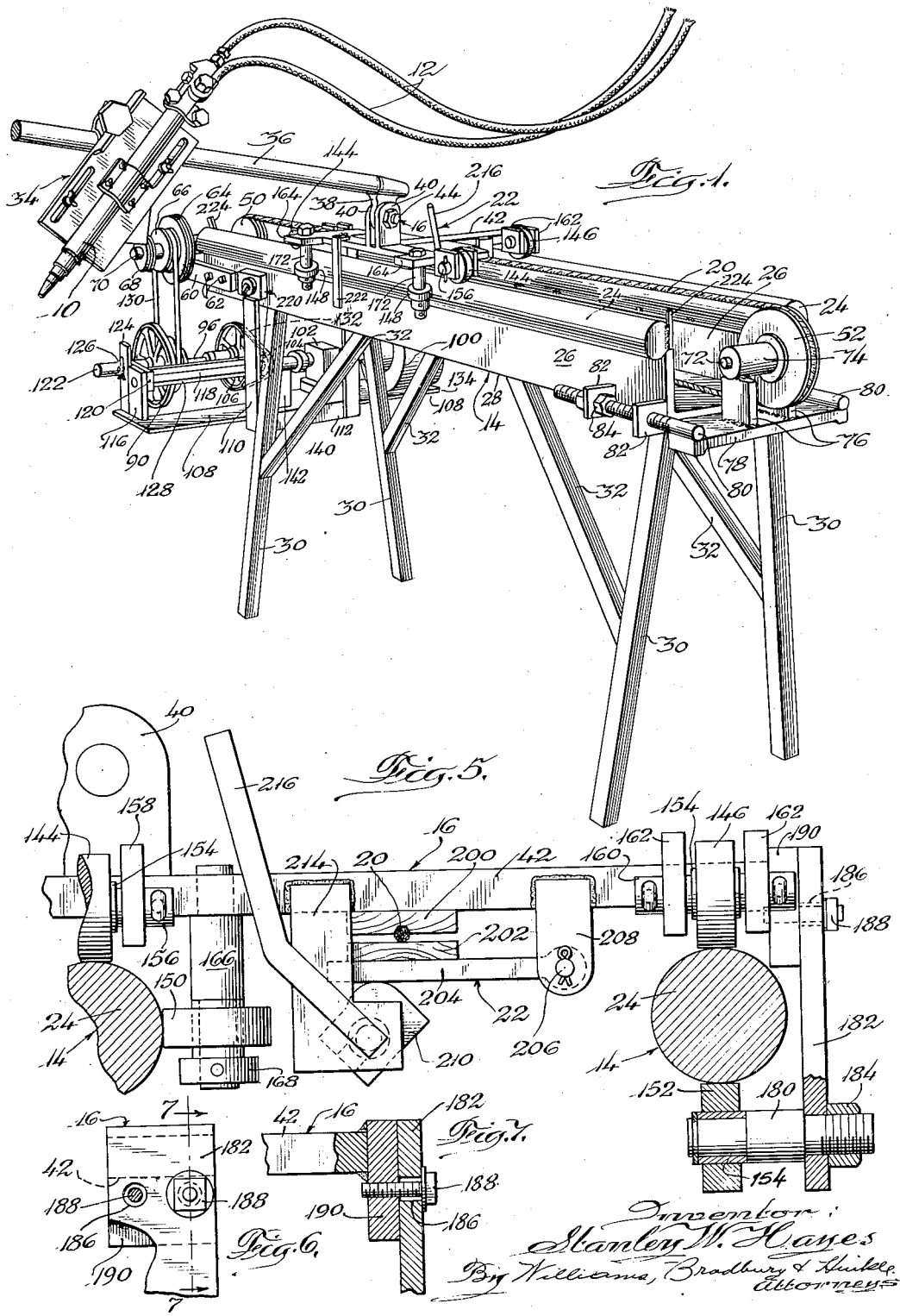

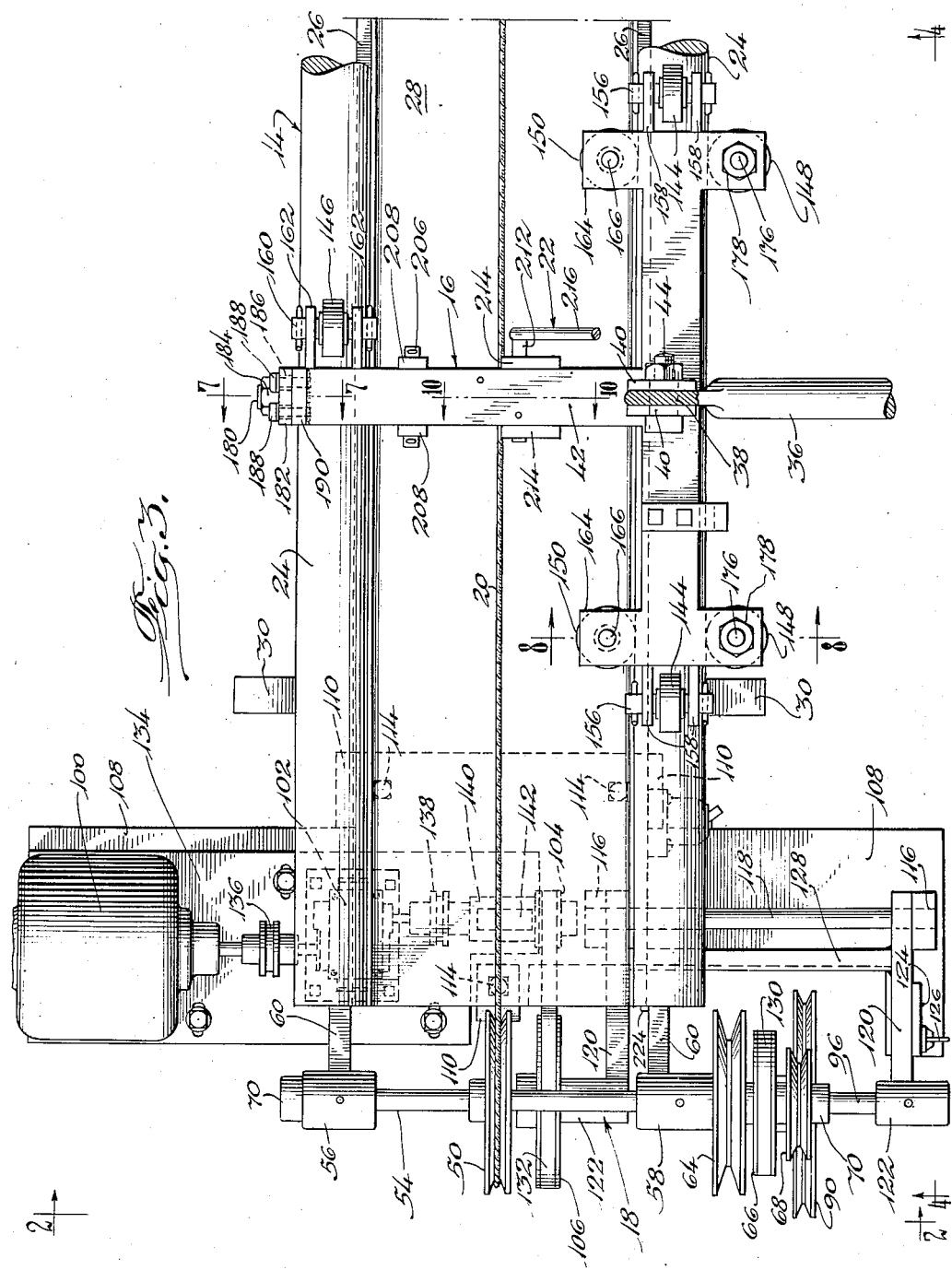

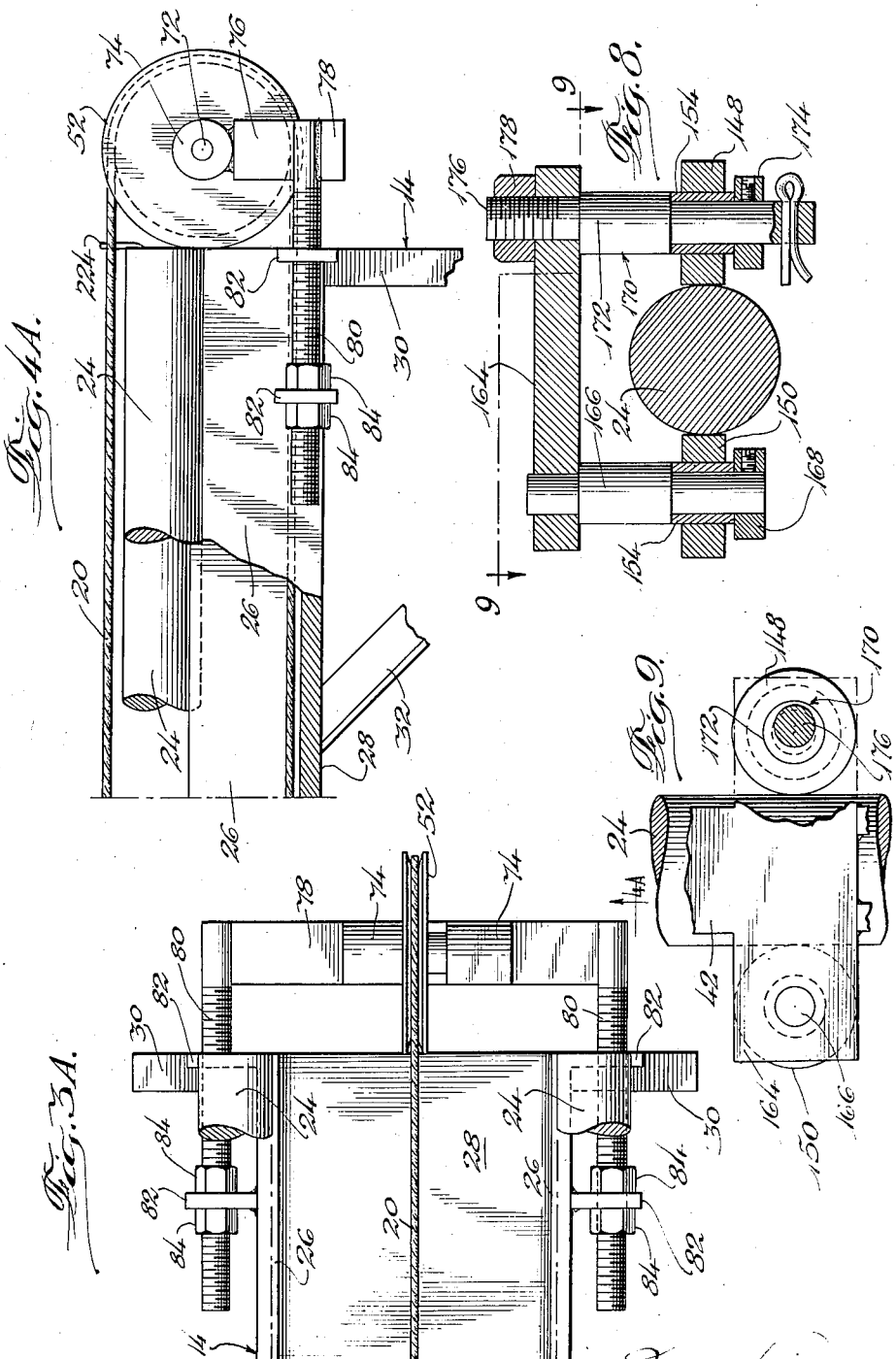

Sept. 6, 1949.  S. W. HAYES  2,481,421
METALWORKING APPARATUS
Filed Dec. 28, 1943  5 Sheets-Sheet 5
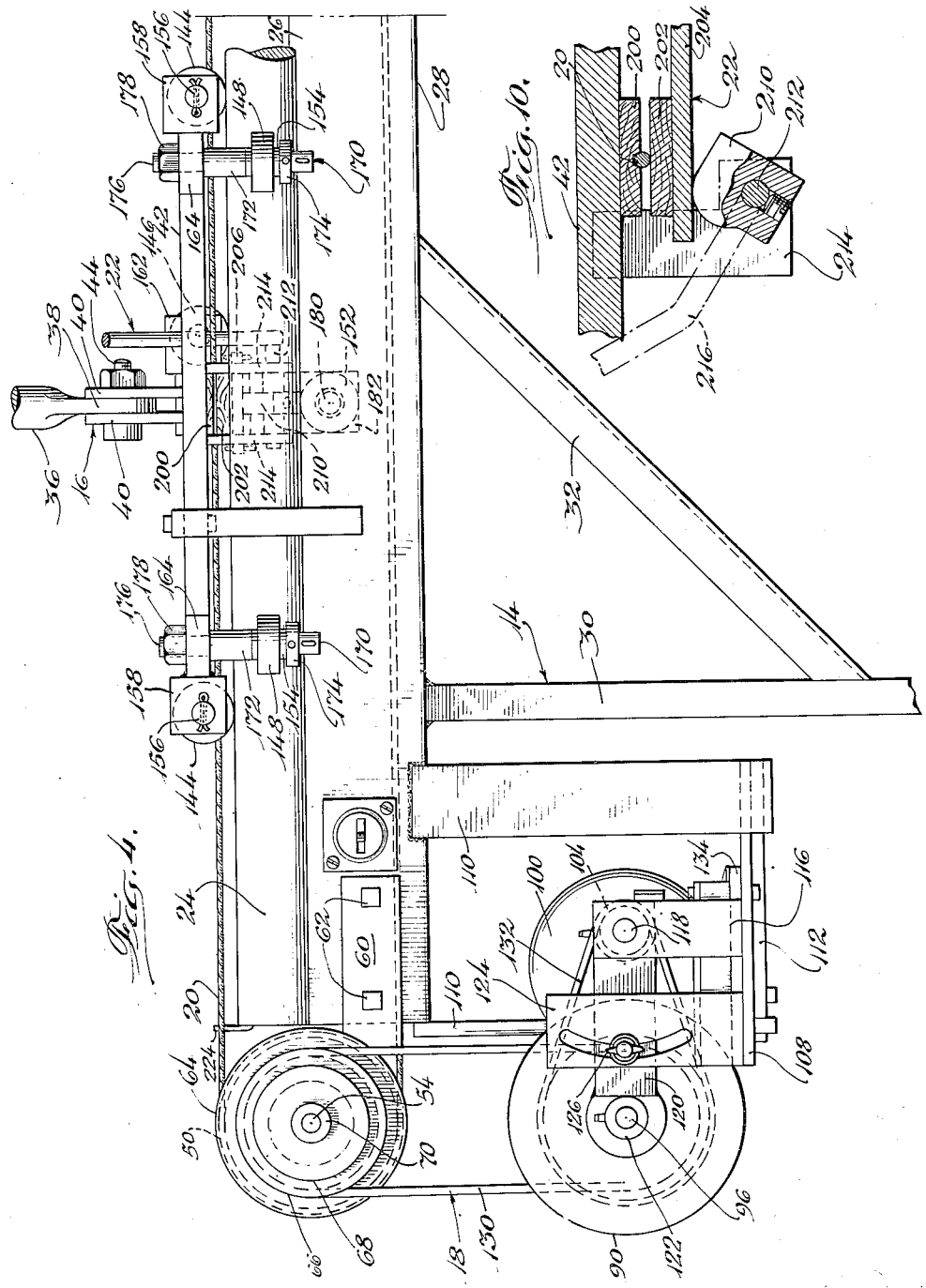

Patented Sept. 6, 1949

2,481,421

UNITED STATES PATENT OFFICE 2,481,421

METALWORKING APPARATUS

Stanley W. Hayes, Richmond, Ind., assignor to Hayes Track Appliance Company, Richmond, Ind., a corporation of Indiana Application December 28, 1943, Serial No. 515,937

4 Claims. (Cl. 266—23)

1

The present invention relates to metal working apparatus and its primary object is the provision of a new and improved metal working machine, and particularly a new and improved straight line torch cutting machine.

In the past, most of the straight line cutting machines comprised a small, motor operated torch supporting carriage movable on a track on the work. Machines of this character are not adapted for cutting plates other than big ones, whereas an advantage of the apparatus of the present invention is that it can be used to cut up small pieces, such as scrap, whenever straight line cuts are desired.

Pantograph machines have sometimes been used, but these have the disadvantage that it is necessary manually to guide the tracing wheel. As compared with machines of this characters, the apparatus of the present invention is simpler to construct and easier to operate; even when made of sufficient length to cut long straight lines, it will not have unwieldy dimensions as would the pantograph machine.

An object of the present invention is to provide a new and improved metal working apparatus which is heavy enough to be firm but light enough to be moved about easily when and if required, and, furthermore, an apparatus which is sturdy and wherein needed repairs can be made quickly and with little expense.

A further object of the present invention is to provide a new and improved metal working apparatus, including a movable carriage, which may be selectively clutched to, or released from, driving means and which is light so that it may be moved back and forth readily. In the apparatus of the present invention the carriage supports one or more torches although it is contemplated that the carriage could support the work for movement relative to a fixed torch. The carriage of the invention is so light and so readily moved that it can be moved back and forth with one finger.

A further object of the present invention is to provide a new and improved metal working apparatus, including a movable carriage which is adapted to be moved by clutching it to an endless cable.

A further object of the present invention is to provide a new and improved apparatus of the character specified in the preceding paragraph wherein the clutch is of a simplified construction and comprises a first clutch jaw secured to the under side of the carriage, a second clutch jaw positioned below the first clutch jaw and pivot-

2 ally connected to the carriage, and a lever operable cam pivoted to the carriage to move the second clutch jaw into and out of cable gripping position.

A further object of the present invention is to provide a new and improved apparatus of the type specified wherein the cable engaging portions of the clutch are made of hard wood.

A further object of the present invention is to provide a metal working apparatus with a new and improved drive and support therefor.

Another object of the present invention is to provide a metal working apparatus of the type including a movable carriage with an improved clutch arrangement, whereby the carriage may be readily and selectively clutched to driving means associated therewith.

Other objects and advantages of the present invention will become apparent from the ensuing description, in the course of which reference is had to the accompanying drawings:

Fig. 1 is a perspective view of the apparatus of the present invention viewed from the front and one end;

Fig. 2 is a fragmentary enlarged end elevational view of the apparatus shown in Fig. 1;

Figs. 3 and 3A are fragmentary plan views of the apparatus, the two views together illustrating the important details of the entire apparatus;

Figs. 4 and 4A are fragmentary front elevational views of the apparatus, Fig. 4A being partly broken away to illustrate details of construction with greater particularity;

Fig. 5 is a fragmentary end elevational view, upon an enlarged scale, of the movable carriage;

Fig. 6 is a fragmentary rear elevational view of the movable carriage;

Fig. 7 is a fragmentary cross sectional view taken along the line 7—7 of Figs. 3 and 6;

Fig. 8 is a cross sectional view of a portion of the carriage supporting and guiding means, the view being taken along the line 8—8 of Fig. 3;

Fig. 9 is a fragmentary plan view, partly sectional in character, taken along the line 9—9 of Fig. 8; and Fig. 10 is a fragmentary sectional view taken along the line 10—10 of Fig. 3 and illustrating details of construction of the clutch mechanism.

Referring now to the drawings and particularly to Fig. 1, it may be noted that the metal working apparatus of the present invention is a cutting apparatus of the type employing a torch 10 supplied with combustible medium through the flexible conduits 12. The apparatus includes a stationary support 14 and a torch supporting carriage indicated generally by the reference character 16 movably mounted on the support. The carriage and torch supported by it are movable lengthwise of the support by means including a variable speed drive, indicated generally by the reference character 18, and including also an endless cable 20 to which the carriage may be clutched by a clutch mechanism, indicated generally by the reference character 22.

The stationary support 14 is primarily characterized by a pair of longitudinal tracks 24, preferably made of cold rolled shafting, secured as by welding to the upwardly extending flanges 26 of a ship building channel 28 supported in horizontal position upon four legs 30 which are suitably braced relative to the channel by braces 32. The legs and braces may be welded to each other and to the transverse portion of the channel 28, thereby to provide a simple and sturdy supporting frame for the apparatus. If desired, an H beam could be used in place of the channel.

The torch supporting carriage 16 is movably mounted on the stationary support and specifically upon the shafting 24, which thus constitute "ways" for the carriage. In the embodiment of the invention illustrated, the carriage supports the torch 10 but it should be understood that many of the principles of the present invention may be embodied in an apparatus wherein the torch is fixed and the work is mounted on the carriage for movement with respect to the torch. Furthermore, a plurality of torches can be mounted upon the carriage.

The torch 10 is secured to a torch support indicated generally by the reference character 34 (which may be constructed in accordance with the disclosure of my Patent No. 2,317,526, granted April 27, 1943), whereby the torch may be readily secured in various positions. The torch support is mounted upon an arm 36 angularly adjustable relative to the movable carriage 16. The angular adjustment is provided by pivotally mounting a lug 38, secured to one end of the arm 36, upon a pair of upright ears 40 suitably secured as by welding to the upper side of a generally T-shaped carriage chassis 42. The arm is secured in adjusted positions by means of a bolt 44 passing through the lug and upright ears.

The endless cable 20, by which the movable carriage is propelled through the variable speed driving means 18 is secured to the frame in such manner that the tension thereof may be readily adjusted. The cable is mounted on a pair of pulleys 50 and 52, the latter of which is adjustable relative to the former and to the stationary support. Pulley 50 is fixedly secured to a drive shaft 54 journaled for rotation in a pair of spaced apart bearings 56 and 58 suitably secured to the upright flanges 26 of the channel 28 as by supporting arms 60, to which the bearings are secured as by welding, in turn secured to the flanges by a plurality of bolts 62. The pulley 50 is located between the bearings 56 and 58, while a plurality of different diameter pulleys 64, 66 and 68 are secured to the end of the shaft 54 projecting beyond the bearing 58. Undesired endwise movement of the shaft 54 is prevented by collars 70 secured to its opposite ends.

The adjustable pulley is mounted on a shaft 72 journaled for rotation in a pair of bearings 74. The bearings 74 are secured as by welding to the upper ends of a pair of uprights 76 secured in turn to a horizontal supporting plate 78 adjustably mounted relative to the stationary support 14. The plate 78 is secured to the ends of a pair of relatively long studs 80 movable into adjusted positions relative to the stationary support. The studs 80 extend through pairs of spaced apart transverse lugs 82 secured to the flanges 26 of the channel 28 and each of the studs is held in adjusted position by a pair of locking nuts 84 located at opposite sides of one of the pairs of lugs 82. It is thus a relatively simple matter to place the required tension on the endless cable 20. It should be noted that, if desired, the supporting arm 60 for the other pulley 50 might also be made adjustable lengthwise of the stationary support.

The cable 20 is preferably a steel cable having its ends spliced and soldered, but it could be a perforated steel ribbon, a link belt chain, or the like.

The variable speed drive of the endless belt 20 includes, in addition to the pulleys 64, 66 and 68, a number of different diameter pulleys 90, 92 and 94 mounted upon a movable countershaft 96 provided with a keyway 98 and driven by an electric motor 100 through a speed reducer 102 and the pulleys 104 and 106, the latter of which is fixedly secured to the countershaft 96.

The driving means is mounted upon a base plate 108 secured to the stationary support 14 by a plurality (3) of downwardly extending supports 110, to the lower ends of which is secured a mounting plate 112 to which the base plate 108 is secured by a plurality of bolts 114. The countershaft 96 is supported on the base plate 108 so that it may be angularly adjusted relative thereto. The countershaft support is supported by means including a pair of upwardly extending lugs 116, across which extends a shaft 118 pivotally supporting a pair of arms 120 to the outer ends of which are secured a pair of bearings 122 in which the countershaft is journaled for rotation. The countershaft may be locked in adjusted angular positions by an arrangement including a slotted upwardly extending plate 124 secured to base plate 108 and a wing nut 126 secured to one of the countershaft supporting arms 120. In order to add to the rigidity of the countershaft assembly, the supporting arms 120 are interconnected also by a cross piece 128.

The three pulleys mounted on the endless belt drive shaft 54 and upon the countershaft 96 may be variously interconnected by a belt 130, illustrated as being of the V-type. If desired, link belts working on sprockets could be utilized so as to provide a more positive drive without maintaining the belts tight. The pulleys 104 and 106 are interconnected by a similar V-belt 132 through which the countershaft is driven at a constant speed by the motor and speed reducer. The motor may be a 1750 R. P. M., ¼ H. P. motor and the speed reducer may have a reduction of 900 to 1.

The motor 100 and speed reducer 102 are mounted on a separate base plate 134 secured, as by a plurality of bolts, to the main base plate 108. The motor and speed reducer are interconnected through a flexible coupling 136, and the speed reducer and pulley 104 are similarly connected through another flexible coupling 138. The pulley 104 is journaled for rotation in a relatively long bearing 140 mounted upon an upwardly extending lug 142 secured to the base plate 134.

The movable carriage 16 includes a number of novel features insuring ease and accuracy of movement. It includes the previously referred to generally T-shaped chassis 42 upon which the torch carrying arm 36 is adjustably mounted. To provide the necessary accurate horizontal support, the chassis has secured to it three wheels adapted to bear on the upper surfaces of the tracks 24. Two of the wheels 144 are located at that side of the apparatus whereat the arm 36 and torch are located, while the third wheel 146 is located at the opposite side. To prevent tipping and to insure accurate movement of the carriage on the track, a pair of wheels 148 are provided to bear against the vertical front surface of the front track 24, a pair of wheels 150 are located to bear against the rear horizontal side of the same track, and a single wheel 152 is provided to bear against the underside of the rear track 24.

The wheels may be made in any suitable manner but it is preferred that each wheel be provided with an inner bronze bushing 154, as illustrated in conjunction with wheel 152 in Fig. 5, so that the wheel may rotate freely relative to its supporting shaft or pin.

The wheels 144 are supported by pins 156 extending through a pair of spaced apart lugs 158 between which the wheels are located and which are secured to the transverse portion of the T-shaped chassis member 42. The pins may be retained in place by suitable means such as cotter pins illustrated but which have not been numbered.

The wheel 146 is similarly secured to the chassis by a pin 160 extending through a pair of lugs 162 secured to the end of the chassis opposite the transverse portion.

The wheels 148 and 150 are secured to opposite transverse projections 164 of the cross bar of the T-chassis, as best illustrated in Figs. 3 and 8. The wheel 150 is secured to the chassis by a downwardly extending stud 166 having an enlarged central portion between which and a collar 168 the wheel 150 is mounted.

The wheel 154 is so mounted on the chassis that its position can be adjusted relative to the way, i. e., the axis of rotation of the wheel 148 may be adjusted relative to the axis of the way 24, thereby to insure accurate movement of the carriage. The wheel is mounted upon a stud 170 having a central enlarged portion 172 between which and a collar 174 the wheel is rotatably mounted. The stud includes a threaded upper portion 176 which is offset relative to the intermediate portion, as best illustrated in Figs. 8 and 9, so that upon loosening of nut 178 the stud may be rotated to vary the position of roller 148 relative to the way 24.

The wheel 152 located underneath the rear way 24 is mounted upon a stud 180 similar to stud 166 but removably attached to a bracket 182 by a nut 184. The wheel 152 is adjustable vertically so that accuracy of engagement with the way 24 is provided. The adjustability is provided by an arrangement enabling bracket 182 to be moved vertically relative to the chassis 42. This arrangement includes enlarged apertures 186 near the upper end of the bracket through which extend a pair of studs 188 secured to a small plate 190 secured to the rear end of the chassis 42.

The carriage is adapted selectively to be connected to the endless belt by clutch mechanism 22 which is best illustrated in Figs. 5 and 10, to which reference is now had. The clutch mechanism includes a pair of jaw members 200 and 202 between which the cable may be gripped, as shown in Fig. 10. The jaw 200 is fixedly secured to the underside of the chassis member 42 and the jaw 202 is fixedly secured to a pivotally mounted supporting arm 204. The arm 204 is pivotally supported by a structure including a pin 206 and a pair of lugs 208 secured to opposite sides of the chassis member 42.

The clutch jaws 200 and 202 are preferably made of hard wood and secured by screw bolts (not shown) to the chassis and supporting arm, respectively. The use of wood results in less wear on the cable. If desired, only a facing of wood could be used, or fibre or soft metal such as lead could be used.

The clutch is adapted selectively to be clutched and declutched by a pivotally movable cam 210 engageable with the jaw mounting member 204. The cam is fixedly secured to a shaft 212 pivotally mounted upon a pair of lugs 214 extending downwardly from and secured to opposite sides of the chassis member 42. An operating lever 216 is secured to one end of the shaft 212 so that an operator may readily effect the engagement and disengagement of the clutch jaws with the endless cable.

In order to stop the carriage when it has been moved in cutting direction to a predetermined point, the carriage is adapted to open a switch 220 controlling energization of the motor. The switch is actually operated by an arm 222 secured to the carriage and projecting downwardly to engage the switch operating lever. Stops 224 are located at opposite ends of the track as a precautionary measure to prevent accidental movement of the carriage from the track when it is moved by hand or power. If the carriage is being moved under power and strikes a stop, the clutch 22 slips so that damage is avoided.

From the foregoing detailed description of the apparatus, it may be noted that the apparatus may be constructed readily and economically, and while heavy enough to be firm it is still light enough to be moved about easily, although this is rarely necessary except for some special job. It can be utilized to cut up large plates as well as scrap and smaller pieces, wherever straight line cuts are desired. Even when made of a length to make exceptionally long cuts the machine will not be of unwieldy dimensions.

The movable carriage is light and when the clutch is released to release the carriage from the cable, the latter can be moved back and forth with one finger. Not only is the carriage light but it is accurately guided by the tracks and the rollers in engagement therewith. Furthermore, the construction is such that the rollers may be adjusted to secure accurate movement of the carriage even after wear has taken place.

In making a cut, the carriage is preferably initially located at the right end of the support, as viewed in Fig. 1, in which figure the carriage is shown at an intermediate position. Assuming that the work has been properly located and the torch 10 properly adjusted relative to it, then the clutch operating lever 216 is operated to effect engagement of the clutch jaws 200 and 202 with the endless cable 20. The motor 100 may or may not be operating at this time. If it is not, the switch 220 is closed as may be some other motor controlling switch, such for example as a reversing switch (not shown), to place the motor into operation. Thereafter, the carriage is moved at a speed determined by the setting of the belt 130 interconnecting the endless belt drive shaft 54 and the countershaft 96, which it may be remembered is driven at a constant speed through the speed reducer 102.

The movable carriage and torch are moved in a straight line at a speed determined in advance and dependent upon the nature of the cut to be made. After the carriage has been started in motion, it moves until the cut is completed, when an operator may deenergize the motor. If desired, the work could be so arranged that the cut would be completed and the movement of the carriage automatically terminated by the opening of switch 220 by the arm 222 on the movable carriage. If desired, the switch could be adjustably mounted so that the carriage movement could be automatically determined at desired points. With the switch in the indicated position, then if an operator should fail to turn off the motor, the motor will be turned off automatically when the switch is opened by arm 222.

It is a relatively simple matter to vary the speed of movement of the carriage. All that is necessary is that the countershaft 96 be loosened by release of the wing nut 126. The belt 130 is thus loosened so that its position may be changed.

In order to maintain the desired tension of the endless belt, the position of pulley 52 may be adjusted by loosening the nuts 84 so that the studs 80 may be moved.

The three-point rolling support of the movable carriage insures accurate guiding thereof by the horizontal top portions of the tracks 24. The pairs of rollers 148 and 150 engaging opposite vertical portions of the front track 24 insure accurate horizontal movement and the rollers 146 and 152 engaging the top and bottom portions of the rear track 24 insure accurate vertical movement of the carriage.

While a single embodiment of the invention has been illustrated, it is contemplated that various modifications may be made therein without departing from the principles of the present invention. It should be understood, therefore, that the details of the illustrated embodiment of the invention are not to be intended to be limitative of the invention except insofar as set forth in the accompanying claims.

Having thus described my invention, what I desire to secure by United States Letters Patent is as follows:

1. In a metal working apparatus, the combination of a longitudinal stationary support including a pair of upright portions interconnected by a lower transverse portion, an endless cable supported between said upright portions and above said transverse portion, a movable carriage supported above said cable by said upright portions, clutch means disengageably connecting said cable and said carriage, means for driving said cable and connected thereto and including a motor, a speed reducer and a countershaft, and means depending from said support for supporting said cable driving means at one end of and below said support, said last mentioned means including a stationary base plate, a first auxiliary supporting plate mounting said motor and said speed reducer and mounted on said stationary base plate, and a second auxiliary supporting plate movably mounting said countershaft and mounted on said stationary base plate.

2. A movable carriage for metal working apparatus adapted to be driven by an endless cable, including in combination, a chassis, a clutch jaw secured to the underside thereof, a second clutch jaw pivotally secured to said chassis and positioned below said first mentioned clutch jaw and adapted to grip the cable between it and said first mentioned clutch jaw, a manually operable lever pivoted to said chassis below said second clutch jaw, and cam means engageable with said second mentioned clutch jaw pivoted to said chassis below said second clutch jaw, said cam means being rotatable by said lever so that said second clutch jaw may be moved into and out of cable gripping position by actuation of said lever.

3. Apparatus as claimed in claim 2 wherein the cable engaging portions of said clutch jaws are made of hard wood.

4. In a metal working apparatus, the combination including, a support comprising rail structure extending in a predetermined direction, a carriage mounted for movement on said rail structure, means including an endless cable drive movable lengthwise of said rail structure for moving said carriage, and means including a two-position clutch for selectively and disengageably connecting said carriage to said endless drive, said means comprising a clutch jaw secured to the underside of said carriage, a second clutch jaw pivotally secured to said carriage and positioned below said first mentioned clutch jaw and adapted to grip the cable between it and said first mentioned clutch jaw, a manually operable lever, means pivotally connecting said lever to said carriage below said second clutch jaw, whereby the lever is movable transversely of the rail structure, and cam means engageable with said second mentioned clutch jaw pivoted to said carriage below said second clutch jaw, said cam means being rotatable by said lever so that said second clutch jaw may be moved into and out of cable gripping position by actuation of said lever.

STANLEY W. HAYES.

REFERENCES CITED

The following references are of record in the file of this patent:

UNITED STATES PATENTS

| Number | Name | Date |
|---|---|---|
| 479,919 | Pendleton | Aug. 2, 1892 |
| 1,319,888 | Miller | Oct. 28, 1919 |
| 1,479,989 | Harris | Jan. 8, 1924 |
| 1,731,691 | Webb | Oct. 15, 1929 |
| 2,054,425 | Jones et al. | Sept. 15, 1936 |
| 2,183,605 | Bucknam et al. | Dec. 19, 1939 |
| 2,187,731 | Davis | Jan. 23, 1940 |
| 2,277,054 | Anderson | Mar. 24, 1942 |
| 2,334,301 | Young | Nov. 16, 1943 |
| 2,336,596 | Chouinard | Dec. 14, 1943 |